May 15, 1945. J. P. PUTNAM 2,376,006
NAVIGATION INSTRUMENT
Filed July 17, 1943 6 Sheets-Sheet 1

INVENTOR=
John P. Putnam
By
Dike, Calver & Porter
ATTORNEYS=

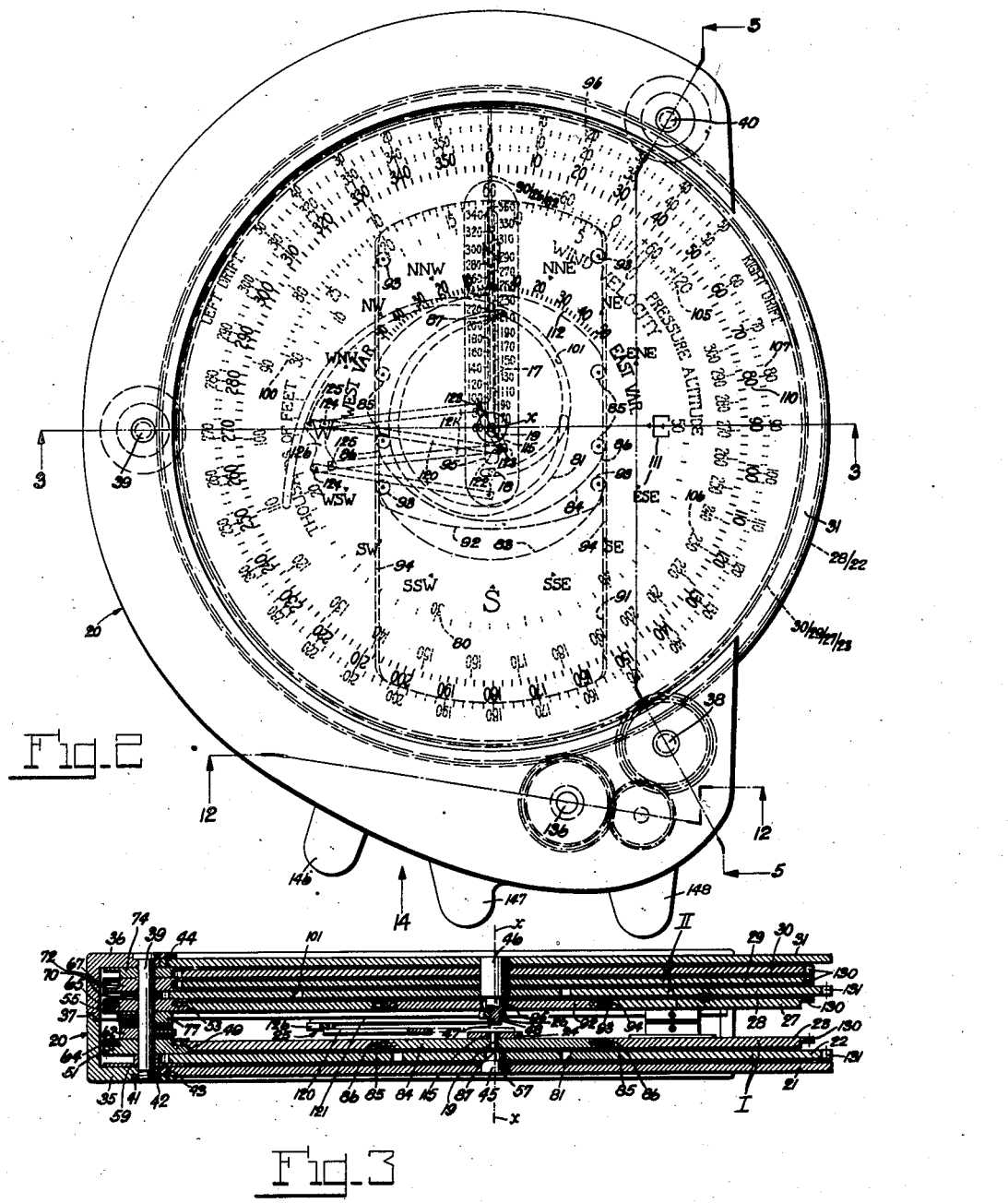

May 15, 1945.　　　　J. P. PUTNAM　　　　2,376,006
NAVIGATION INSTRUMENT
Filed July 17, 1943　　　6 Sheets-Sheet 3

INVENTOR=
John P. Putnam
By
Dike, Calver & Porter
ATTORNEYS=

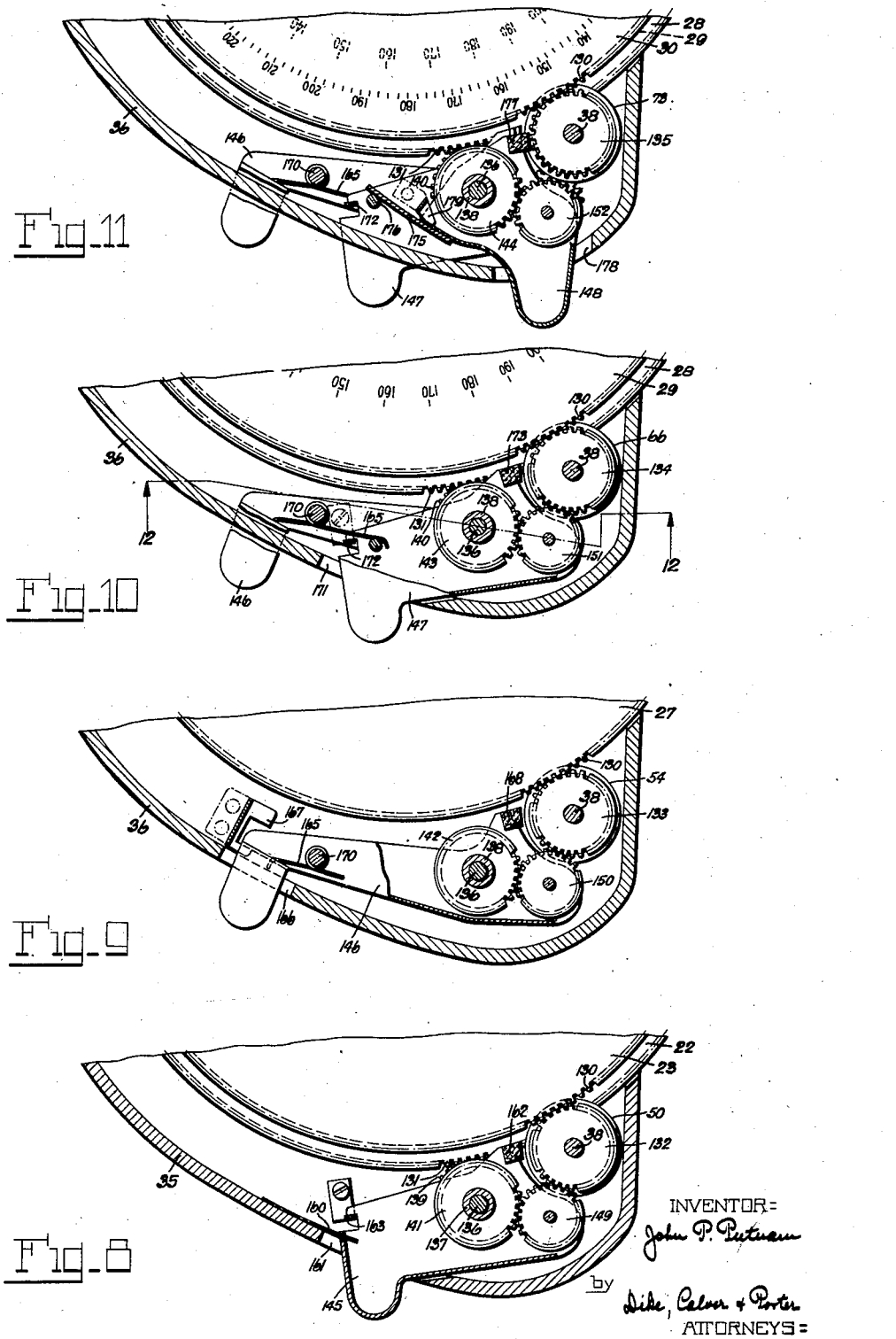

May 15, 1945.  J. P. PUTNAM  2,376,006
NAVIGATION INSTRUMENT
Filed July 17, 1943  6 Sheets-Sheet 5

INVENTOR:
John P. Putnam
by
Dike, Calver & Porter
ATTORNEYS

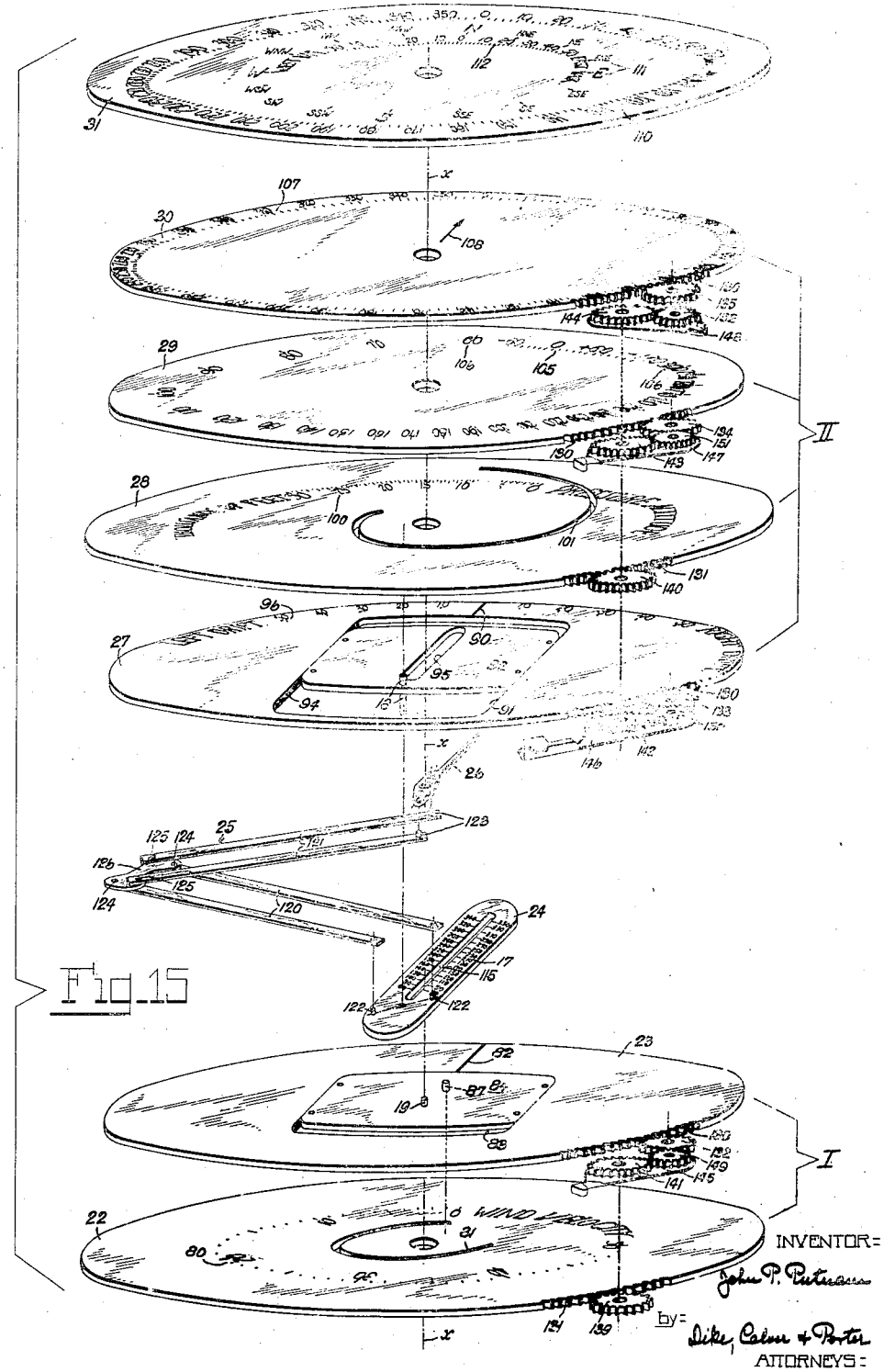

Patented May 15, 1945

2,376,006

UNITED STATES PATENT OFFICE 2,376,006

NAVIGATION INSTRUMENT

John P. Putnam, Boston, Mass., assignor to The Reece Button Hole Machine Company, Boston, Mass., a corporation of Maine Application July 17, 1943, Serial No. 495,089

4 Claims. (Cl. 74—389)

This invention relates to navigation instruments and more particularly, though not exclusively, to instruments for use in aerial navigation.

The instrument to which the present invention pertains is of the type disclosed in my co-pending application Serial No. 459,922, filed September 28, 1942. This instrument can be set in accordance with such readily ascertainable data as the true course of an objective to be reached, the compass variation of the locality, the indicated air speed of a plane, the air temperature, the altitude at which the plane flies, and the direction and velocity of the wind, whereupon the instrument will immediately and directly indicate the ground speed of the plane and the magnetic course to be followed in order to reach the objective under these conditions. The instrument includes a plurality of separately coaxially turnable disks which are relatively angularly adjusted for the purpose of setting the instrument in accordance with the data above mentioned. These disks may be divided into two groups of which one group is used for setting the instrument in accordance with the direction and velocity of the wind, and the other group is used for setting the instrument in accordance with the remaining data. In order that the instrument may be set by these disks, the disks of each group as well as the disk groups must be relatively angularly adjustable.

It is the primary aim and object of the present invention to provide for facile and accurate relative angular adjustment of the rotatable disks of the instrument for setting the latter.

It is a more particular object of the present invention to provide a driving connection between these disks such that the disks of each group, as well as the disk groups, may be relatively angularly adjusted on manually turning only one certain disk of each group.

It is also among the objects of the present invention to provide for locking the disks of each group against relative rotation except during their angular relative adjustment, thereby precluding any accidental shifting of said disks out of their adjusted angular relative position.

The foregoing and other objects of the invention, together with means whereby the latter may be carried into effect will best be understood from the following description of an illustrative embodiment shown in the accompanying drawings: in which, In the drawings:

Fig. 2 is a top plan view of the instrument.

Fig. 3 is a section taken substantially along the line 3—3 of Fig. 2.

Figs. 6 and 7 are diagrammatic views to be referred to.

Figure 5:
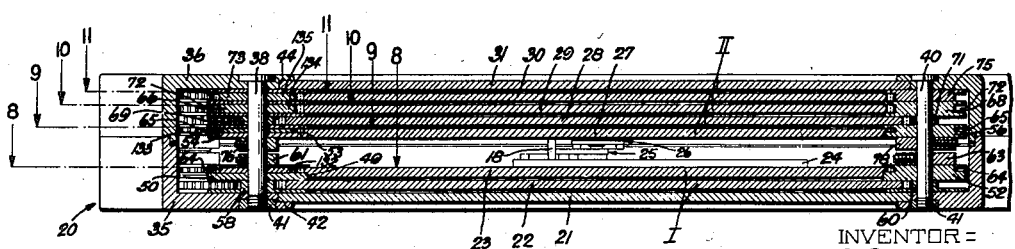
Fig. 5 is a section taken substantially along the line 5—5 of Fig. 2.

Figs. 8, 9, 10 and 11 are fragmentary sections taken substantially along the lines 8—8, 9—9, 10—10 and 11—11, respectively, of Fig. 5.

Figure 12:
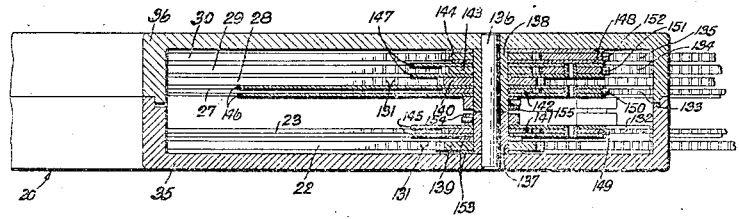

Fig. 12 is a fragmentary section taken substantially along the line 12—12 of Fig. 2 or 10.

Figure 13:
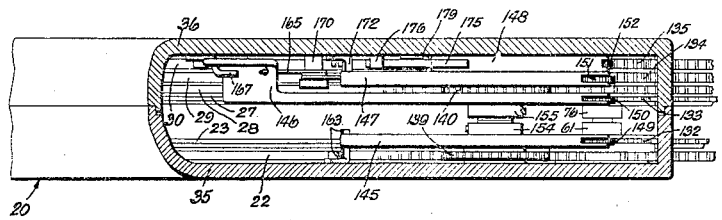

Fig. 13 is a fragmentary side elevation of the instrument with part of the instrument casing broken away.

Figure 14:
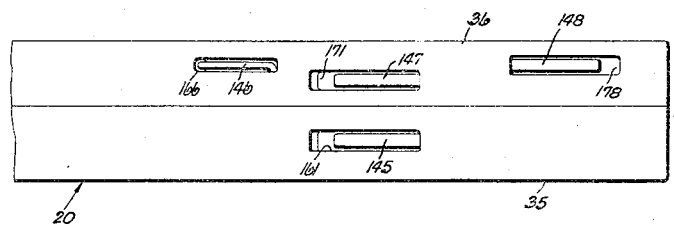

Fig. 14 is a fragmentary side elevation of the instrument as viewed in the direction of the arrow 14 in Fig. 2.

Fig. 15 is a perspective view of the disassembled active parts of the instrument.

Figure 1:
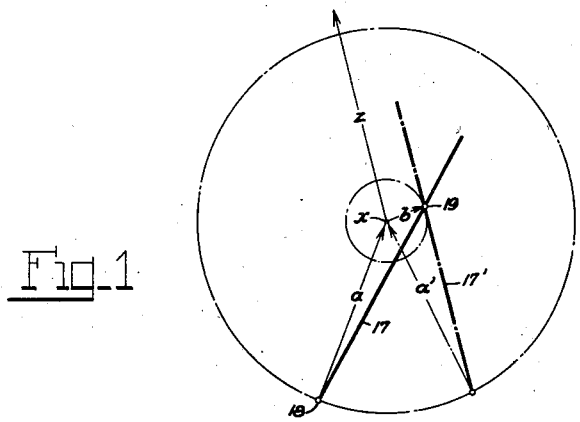
Fig. 1 is a diagram illustrating the principle of operation involved in the present instrument.

Briefly, the principle on which the present instrument is based involves the following. A linear, uniformly graduated scale 17 (Fig. 1) carries at the zero point thereof a transverse pivot or stud 18, and slidably receives a floating pivot or stud 19. Each of the pivots 18 and 19 is independently movable radially of, and circularly about, a fixed common axis $x$. In using the instrument, the pivot 18 is, in any disposition of the scale 17, adjusted radially of the fixed axis $x$ such that the length of the radial arrow or vector $a$ represents, in the calibration of the scale 17, the indicated air speed of a plane. The floating pivot 19 is thereupon adjusted radially of, and/or circularly about, the fixed axis $x$ such that the radial arrow or vector $b$ points in the direction of the prevailing wind and its length represents, also in a calibration of the scale 17, the wind velocity. The scale 17 may then assume the full line position shown in Fig. 1, for instance, and point in the true direction of flight of the plane as well as indicate the ground speed of the same opposite the pivot 19 if the plane is headed in the direction of the vector *a*. However, the track or true course to the objective to be reached is represented by the arrow *z*, wherefore the track or true direction of flight of the plane has to coincide with said arrow. This is accomplished by merely circularly adjusting the pivot 18 about the fixed axis *x* until the scale 17 assumes the dot-and-dash line position 17′ parallel to the magnetic compass course *z*. Such circular adjustment of the pivot 18 changes neither the length of the vector *a* (representing the indicated air speed of the plane), nor the length or angular disposition of the vector *b* (representing the direction and velocity of the wind), with the result that the ground speed of the plane is indicated on the dot-and-dash line scale 17′ opposite the pivot 19 when the plane is headed in the direction of the vector *a*′ but flies actually along the track *z* due to side drift caused by the wind. If there is no wind, the pivot 19 is radially shifted into coextension with the common axis *x* so that the wind vector becomes zero.

Referring now particularly to Figs. 2, 3 and 15, the instrument embodying the described principle comprises a casing 20 of the open ring shape shown in Fig. 2 in which are disposed, in parallel superposed relation and in the order named, a bottom plate 21, a wind velocity disk 22, a wind direction disk 23, a track link 24 carrying the above-mentioned scale 17, a four-bar linkage 25, a track pointer 26, a heading disk 27, an air speed disk 28, an air speed correction disk 29, a magnetic compass disk 30, and a top or true compass point plate 31. All of the above-named parts, with the possible exception of the casing 20 and the bottom plate 21, are composed of transparent (preferably sheet plastic) material to render visible, through overlying parts, scale graduations and other inscriptions (to be described) on underlying parts. The casing 20 consists preferably of two complementary sections 35 and 36 of the cross section shown in Fig. 3. The sections 35 and 36 preferably interfit as at 37 and are secured together by spaced studs 38, 39 and 40, and nuts 41 received by said studs (see also Fig. 5). The bottom section 35 of the casing is provided with a circular recess 42 in which is secured, by pins 43, for instance, the circular bottom plate 21. The top section 36 of the casing is likewise provided with a circular recess 44 in which is secured the top or true compass point plate 31 coaxially of the bottom plate 21. Integral with, or suitably secured to, the bottom plate 21 is a central, upwardly projecting cylindrical post 45 on which the wind velocity disk 22 is journalled. Integral with, or suitably secured to, the top plate 31 is a downwardly projecting cylindrical post 46 which extends coaxially of the post 45. Journalled on the post 46 are the magnetic compass disk 30, the air speed correction disk 29 and the air speed disk 28. Further journalled on the lower, reduced end 47 of the post 46 is the track pointer 26 which is held against axial movement thereon by a conventional split ring 48, for instance. The posts 45 and 46 are also of transparent (preferably sheet plastic) material. The wind direction disk 23 is journalled by having a reduced peripheral portion 49 thereof ride on the peripheries of rotatable rollers or wheels 50, 51 and 52 on the spaced studs 38, 39 and 40, respectively (Figs. 3 and 5). The heading disk 27 is likewise journalled by having a reduced peripheral portion 53 thereof ride on the peripheries of rotatable rollers or wheels 54, 55 and 56 on the studs 38, 39 and 40, respectively (Figs. 3 and 5).

The various rotatable disks of the instrument between the top and bottom plates are held against axial movement in the following manner. The lowermost (wind velocity) disk 22 rests preferably on an annular shoulder 57 of the post 45 and is held against axial movement by having its periphery project between the wheels 50, 51 and 52 (Figs. 3 and 5) and cooperating rotatable spacer wheels 58, 59 and 60, respectively, on the spaced studs 38, 39 and 40, respectively. The cooperating wheel pairs 50, 58 (Fig. 5) and 51, 59 (Fig. 3) as well as 52, 60 (Fig. 5) are held against axial movement on their studs 38, 39 and 40, respectively, by adjustable collars 61, 62 and 63, respectively. The next (wind direction) disk 23 projects with its periphery into annular grooves 64 in the axially immovable wheels 50, 51 and 52 (Figs. 3 and 5) and is thus held against axial movement. The next (heading) disk 27 projects with its periphery into annular grooves 65 in the wheels 54, 55 and 56 which are held axially immovable on their respective studs 38, 39 and 40 in a manner hereinafter described. The next (air speed) disk 28 is held axially immovable by having its periphery project between the wheels 54, 55, 56 and other rotatable, but axially immovable, wheels 66, 67 and 68 on the studs 38, 39 and 40, respectively. The cooperating wheel pairs 54, 66 and 55, 67 as well as 56, 68 are preferably held spaced from each other by spacers 69, 70 and 71, respectively, which are of substantially the same thickness as the air speed disk 28. The next (air speed correction) disk 29 is held against axial movement by having its periphery project into annular grooves 72 in the axially immovable wheels 66, 67 and 68. The next and uppermost (magnetic compass) disk 30 is axially immovable by having its periphery project between the wheels 66, 67 and 68 and cooperating rotatable, but axially immovable, spacer wheels 73, 74 and 75, respectively, on the studs 38, 39 and 40, respectively. The various wheels and spacers 54, 69, 66, 73 (Fig. 5) and 55, 70, 67, 74 (Fig. 3) as well as 56, 71, 68, 75 (Fig. 5) on their respective studs 38, 39 and 40, are held against axial movement by adjustable collars 76, 77 and 78, respectively. The track link 24 is preferably held slidable on top of a slide (to be described) in the wind direction disk 23 by the four-bar linkage 25 which is interposed between the track link 24 and the track pointer 26.

Referring now to Figs. 2 and 15, the wind velocity disk 22 is inscribed with a concentric scale 80, preferably 270° in length and graduated to represent wind velocities in miles per hour, the graduations being preferably uniformly spaced. The disk 22 is further provided with a spiral cam slot 81 whose maximum radius is radially opposite the zero point of the scale 80 and whose minimum radius is radially opposite the maximum point on said scale, herein shown as representing 50 miles per hour.

Figure 4:
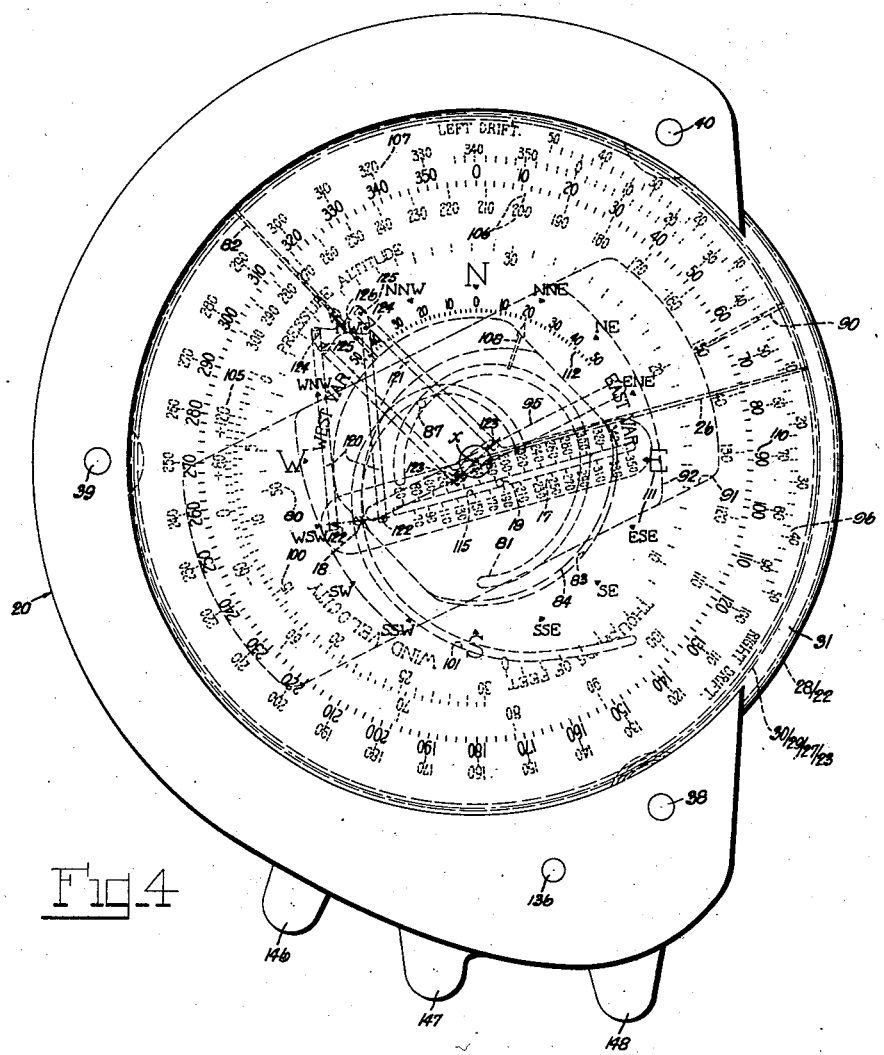
Fig. 4 is a view similar to Fig. 2, showing the instrument in use.

Referring to Figs. 2, 4 and 15, the wind direction disk 23 has inscribed thereon a radial index line 82, and is formed with a cut-out guideway 83 which is disposed radially or diametrically of the disk 23 and whose center line is in alignment with the index line 82. Movable in the guideway 83, for movement diametrically of the disk 23, is the previously mentioned slide 84. The side edges of the slide 84 may slidably engage the parallel edges of the guideway 83, or, preferably, said slide is provided with disk-like rollers 85 (Figs. 2 and 3) which ride in grooves 86 in said guideway edges. The slide 84 carries a pin or follower 87 (see particularly Fig. 15) which is received by the spiral cam slot 81 in the wind velocity disk 22, whereby the position of said slide in its guideway 83 is determined by the relative angular position of the disks 22 and 23. The slide 84 further carries on its center line the previously mentioned pivot or stud 19.

Referring to Figs. 2, 3 and 15, the heading disk 27 is inscribed with a radial index line 90 and formed with a diametric guideway 91, the arrangement of said index line and guideway being similar to that of the index line 82 and guideway 83 of the wind direction disk 23. Movable in the guideway 91 is a slide 92 which is similar to the slide 84 and, like the latter, preferably provided with disk rollers 93, received in grooves 94 in the parallel edges of the guideway 91. The slide 92 is provided with a diametric slot 95 through which the post 46 extends with clearance (see particularly Fig. 3). The heading disk 27 is preferably further inscribed near its periphery with an arcuate scale 96 graduated to represent drift angles, left and right.

Referring to Figs. 2, 3 and 15, the air speed disk 28 is incribed with a concentric scale 100, graduated to represent altitudes in thousands of feet, the graduations being logarithmically spaced for a purpose hereinafter described. Said disk 28 is also provided with a cam slot 101 in the shape of a logarithmic spiral. The cam slot 101 receives the previously mentioned pivot or stud 18 (see also Figs. 1 and 15) which is carried by the slide 92, whereby the position of said slide in its guideway 91 is determined by the relative angular position of the disks 27 and 28.

Referring to Figs. 2 and 15, the air speed correction disk 29 is inscribed about a portion of its margin with a concentric scale 105, graduated to represent temperatures preferably in degrees Fahrenheit, and about the remainder of its margin with a concentric scale 106, graduated to represent indicated air speeds in miles per hour, the graduations of both scales being logarithmically spaced for a purpose hereinafter explained. The logarithmic temperature scale 105 is adapted to cooperate with the logarithmic altitude scale 100 of the disk 28 (see also Fig. 2) to apply air speed correction for altitude and temperature.

Referring to Figs. 2 and 15, the magnetic compass disk 30 is inscribed with a concentric scale 107, graduated in degrees and indicating azimuth compass bearings. The disk 30 is further inscribed with a radial arrow or reference line 108.

Again referring to Figs. 2 and 15, the top or true compass point plate 31 is inscribed with a concentric scale 110, graduated in degrees and reading in azimuth, and preferably also with a second concentric scale 111, marked with the usual points of the compass. The plate 31 is preferably further inscribed with an arcuate scale 112, graduated in degrees and indicating magnetic variations, east and west.

The index lines 82 and 90 on the disks 23 and 27, respectively, as well as the track pointer 26 are adapted to cooperate with either scale 107 or 110 on the magnetic compass disk 30 or the true compass point plate 31, respectively (see particularly Fig. 4). The index line 82 on the wind direction disk 23 is adapted to further cooperate with the scale 111 on the true compass point plate 31, and the track pointer 26 is adapted to further cooperate with the drift scale 96 on the heading disk 27. The arrow 108 on the magnetic compass disk 30 is adapted to cooperate with the compass variation scale 112 on the true compass point plate 31.

Referring to Figs. 2, 3 and 15, the track link 24 is formed with a centrally disposed, longitudinal slot 115 along the side or sides of which is inscribed the earlier mentioned scale 17, uniformly graduated to represent ground speeds in miles per hour. The link 24 is at the zero point of the scale 17 connected with the pivot or stud 18 (Figs. 2, 4, 5 and 15), while the slot 115 receives the previously mentioned pivot or stud 19 (Figs. 2, 3, 4 and 15) on the slide 84.

The scales 80, 100, 105 and 106, representing wind velocities, altitudes, temperatures and air speeds, respectively, being circularly arranged, permit a wider range and more open spacing of their graduations than would be possible with rectilinear scales. The several circular scales 96, 107, 110, 105, 106, 100, 80, 111 and 112, while concentrically disposed, are located at different radial distances from the common axis x of the instrument so that, in all positions of adjustment, all are clearly visible and unobscured by any of the others, and therefore can be easily read. The ground speed scale 17 on the track link 24 cooperates with the pivot or stud 19, as mentioned, and in practically all positions of adjustment, at least those likely to be more frequently used, the position of the pivot 19 and of the portion of the scale 17 adjacent thereto, is within or removed from all of the other scales, thereby facilitating the reading of the ground speed on said scale 17.

The track pointer 26, which is rotatable about the common axis x of the instrument, is drivingly connected with the track link 24 by the four bar linkage 25 which is shown and described in my copending application, Serial No. 487,307, filed May 17, 1943. The linkage 25 is so constructed and arranged that the track pointer 26 will always extend parallel to the track link 24 in any position of the latter. Briefly, the linkage 25 comprises two link pairs 120 and 121 (Figs. 2, 3, 4 and 15) which are pivotally connected at 122 and 123, respectively, with the track link 24 and the track pointer 26, respectively, and at 124 and 125, respectively, with a floating spacer 126. The links of each pair 120 and 121 are of equal length and the pivots 122 and 123 are equally spaced. Furthermore, the pivots 122 are equally spaced from, and lie on a straight line passing through, the axis of the pivot or stud 18 on the track link 24 (Figs. 4 and 15) and the pivots 123 are equally spaced from, and lie on a straight line passing through, the common axis x of the instrument (Figs. 2 and 4). The pivots 124 and 125 are so arranged on a circle of a diameter equal to the spacing of the pivots 122 or 123 that the links of each pair 120 and 121 extend parallel. The track link 24, link pair 120, spacer 126, link pair 121 and track pointer 26 are preferably movable in progressively spaced parallel planes (Fig. 3) so that the track pointer 26 may shift to either side of the track link 24 and sweep through a maximum range, the limits of which are reached only when the links of either pair 120, 121 engage each other. With the linkage 25 thus constructed and assembled with the track link 24 and the track pointer 26 in parallel relation, the track pointer will always extend parallel to the track link 24 in any position of the latter.

Figure 6:
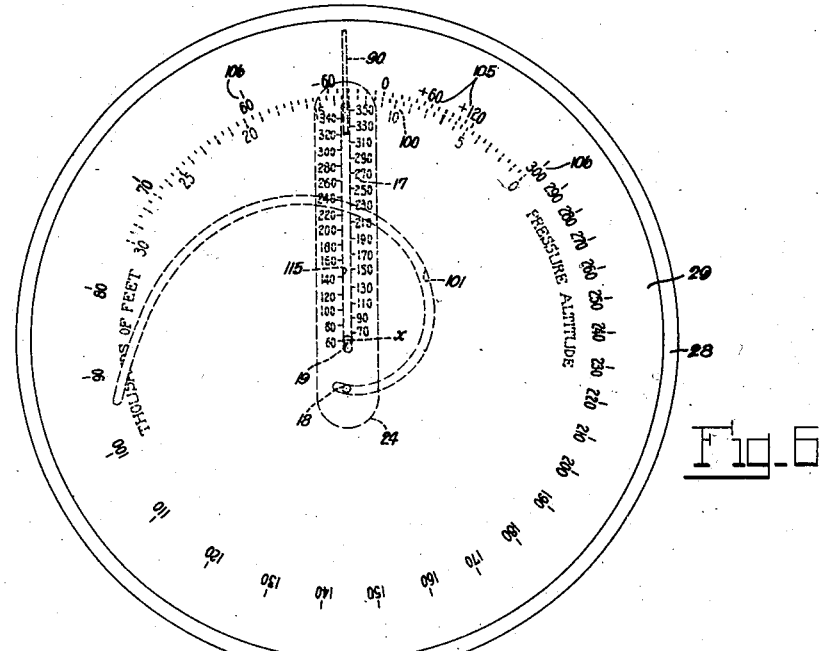
Figure 7:
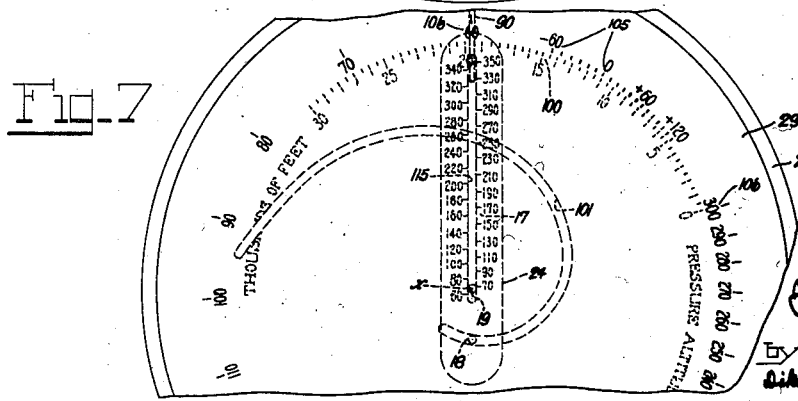

It will be observed in Fig. 2 that the indicated air speed on the logarithmic scale 106 of the air speed correction disk 29 opposite the index line 90 on the heading disk 27 is the same (60 miles per hour) as that on the uniformly graduated ground speed scale 17 on the track link 24 opposite the common axis $x$ of the instrument, if the pivot 19 is co-extensive with the common axis $x$ (meaning no wind correction) and the disks 28 and 29 assume the relative angular position shown in Fig. 2 in which the zero mark of the logarithmic altitude scale 100 is opposite the $+60°$ mark of the logarithmic temperature scale 105. The logarithmic spiral cam slot 101 is so coordinated with the speed scales 106 and 17 that, with the parts coordinated as just described, and on rotation of the disk 27 relative to the disks 28 and 29, or vice versa, any other speed indication opposite the index line 90 will coincide with the speed indication on the scale 17 opposite the axis $x$. The logarithmically spaced graduations of the temperature and altitude scales 105 and 100, respectively, though inscribed in degrees Fahrenheit and thousands of feet, respectively, represent factors by which the indicated air speed of a plane has to be multiplied in order to obtain the true air speed of the plane at corresponding altitudes and temperatures. Since it is standard practice to give the indicated air speed of a plane at $+60°$ F., and at sea level or zero altitude, the $+60°$ F. mark on the temperature scale 105 and the zero mark on the altitude scale 100 represent the factors 1 (unity), and these scales are so coordinated that said factors 1, if alined as shown in Fig. 2, undertake no correction of the indicated air speed as evidenced by the identical speed indications on the scales 106 and 17 opposite the index line 90 and the axis $x$, respectively. For any other altitude and/or temperature, the air speed correction disk 29 is turned relative to the air speed disk 28 until the respective altitude and temperature marks on the scales 100 and 105 are brought into alinement, with the result that the speed scale 106 is angularly displaced, from the relative angular position of the disks 28 and 29 shown in Fig. 2, an amount which is proportional to the algebraic sum of the logarithms of the altitude and temperature factors by which the indicated air speed has to be multiplied in order to obtain the true air speed. In this connection, it will be observed from Fig. 2 that the factors for temperatures between plus 59° and minus 60° F., are less than 1, wherefore their logarithms are negative. All other factors on the logarithmic correction scales 100 and 105 are 1 or larger than 1 and their logarithms are positive. By angularly adjusting the air speed correction disk 29 in accordance with a certain altitude other than zero and/or a certain temperature other than $+60°$ F., as described, the disks 28 and 29 are relatively angularly displaced, from their "no-correction" relative angular position (Fig. 2), an amount which, for any indicated speed on the scale 106 opposite the index line 90, results in a radial shifting of the pivot 18 through a distance which, in the calibration of the ground speed scale 17, represents the corresponding speed correction. As an example, let it be assumed that the indicated air speed of a plane is 60 miles per hour and the various parts of the instrument are set as shown in Fig. 2, the true air speed of the plane at 7000 feet altitude and $+80°$ F., may then be obtained by turning the air speed correction disk 29 counterclockwise as viewed in Fig. 2 relative to the air speed disk 28 until the $+80°$ F., mark on the scale 105 alines with the 7000 foot altitude mark on the scale 100 (Fig. 6). Thereupon, the disks 28 and 29 are turned in unison clockwise as viewed in Fig. 6 until the 60 mile mark on the speed scale 106 alines with the index line 90 (Fig. 7), whereupon the speed indication on the ground speed scale 17 opposite the axis $x$ of the instrument represents the true air speed (approximately 68 miles per hour). The true air speed is always proportional to the distance between the pivot 18 (zero point of ground speed scale 17) and the common axis $x$, and a straight line connecting said pivot 18 and axis $x$ is, in any position of the track line 24, a vector like the vector $a$ in Fig. 1, considering thereby that said vector represents, in the calibration of the ground speed scale 17, the indicated air speed plus (or minus, as the case may be) the speed correction due to altitude and/or temperature. The direction of this vector may, of course, be changed at will without changing its length, by merely turning the disks 27 and 28 in unison.

The uniformly graduated wind velocity scale 80 and the spiral cam slot 81 in the wind velocity disk 22, and the index line 82 on the wind direction disk 23, are so coordinated that the pivot 19 on the slide 84 is coextensive with the common axis $x$ of the instrument on alinement of said index line 82 with the zero point of said scale 80 (Fig. 2), and is shifted radially of the wind direction disk 23, on relative rotation between the disks 22 and 23 through any speed range on the scale 80, through a distance which is equal to the same speed range on the ground speed scale 17. Hence, a straight line connecting the axis $x$ with the pivot 19 (Fig. 1) represents a wind direction and velocity vector which may be properly combined with the true air speed vector abovedescribed to form a parallelogram of motion.

Provisions are made to facilitate the accurate relative angular adjustment of the various rotatable disks of the instrument for the purpose of setting the latter. To this end, the disks are divided into two groups of which one group I (Figs. 3, 5 and 15) consists of the disks 22 and 23, and the other group II consists of the disks 27, 28, 29 and 30. For a reason which will become obvious hereinafter, the disks 22 and 28 are of the same diameter and the disks 23, 27, 29 and 30 are also of the same diameter, though the latter disks are smaller in diameter than the former disks. The top and bottom plates 31 and 21 are preferably of the same diameter as the larger disks 22 and 28. The smaller disks 23, 27, 29 and 30 are provided with an equal number of peripheral gear teeth 130 (Figs. 3, 8 to 11 and 15), and the larger disks 22 and 28 are also provided with an equal number of peripheral gear teeth 131 of the same circular pitch as the gear teeth 130. Permanently meshing with the teeth 130 of the smaller disks 23, 27, 29 and 30 are pinions 132, 133, 134 and 135, respectively (Figs. 5, 8 to 11 and 15), which are of equal size and form part of the previously mentioned, independently rotatable wheels 50, 54, 66 and 73, respectively, on the stud 38. Mounted in the sections 35, 36 of the instrument casing 20 is a pin 136 (Fig. 12) on which two axially immovable bushings 137 and 138 are journalled. Suitably mounted on the bushings 137 and 138 for rotation therewith are identical pinions 139 and 140, respectively, which are larger in size than the pinions 132 to 135 and in permanent mesh with the teeth 131 of the larger disks 22 and 28, respectively (Figs. 12 and 15). Further mounted on the bushings 137 and 138 for rotation therewith are identical pinions 141 and 142, 143, 144, respectively (see also Figs. 8 to 11) which are on the same level with, and of the same size as, the pinions 132, 133, 134 and 135, respectively (Figs. 12 and 15). Journalled on the bushings 137 and 138 are operating levers 145 and 146, 147, 148, respectively (Figs. 8 to 12). More particularly, the levers 145, 146, 147 and 148 straddle the pinions 141, 142, 143 and 144, respectively, and rotatably carry identical idler pinions 149, 150, 151 and 152, respectively, which are in permanent mesh with said pinions 141, 142, 143 and 144, respectively. The idler pinions 149, 150, 151 and 152 may be brought into and from meshing engagement with the pinions 132, 133, 134 and 135, respectively, on rocking the levers 145, 146, 147 and 148, respectively (Figs. 8 to 11). The pinion 139 and operating lever 145 are held on the bushing 137 in the axially spaced relation shown in Fig. 12 by means of spacers 153 and an adjustable collar 154. The pinion 140 and the operating levers 146, 147 and 148 are held on the bushing 138 in the axial relation shown in Fig. 12 by means of an adjustable collar 155.

In the present instance, the larger disks 22 and 28 are the "driving" disks for the disk groups I and II, respectively, meaning that the driving disk 22 is employed in order to turn either one or both of the disks of group I (Fig. 15), and the driving disk 28 is employed in order to turn any one or all of the disks of group II. The gear arrangement is such that either driving disk 22 or 28 turns any other drivingly connected disk of its group at a 1 to 1 speed ratio. By way of example, the driving disks 22 and 28 may each be provided with 256 teeth, each of the other disks 23, 27, 29 and 30 may be provided with 240 teeth, and the pinions 139 and 140 may have 32 teeth, in which case all the other pinions, except the identical idler pinions 149 to 152, would have 30 teeth in order to accomplish the required 1 to 1 speed ratio.

The operating lever 145 is normally urged by a spring 160 into the operative position shown in Fig. 8, in which the idler pinion 149 is in mesh with the pinion 132, so that the disks 22 and 23 will be turned in unison on turning the driving disk 22 (Fig. 15). The lever 145 extends through a slot 161 in the casing 20 (see also Fig. 14) so as to be depressible into inoperative position in which the idler pinion 149 is out of mesh with the pinion 132 and the disks 22 and 23 are disconnected. The lever 145, which is preferably channel-shaped cross-sectionally, carries a brake piece 162 of any suitable material, such as leather, for instance, which engages the teeth of the pinion 132 when said lever 145 is in its inoperative position, thus arresting the disk 23 against rotation when the same is not drivingly connected with the driving disk 22. A preferably adjustable stop 163 in the casing 20 (Figs. 8 and 13) limits the rocking motion of the lever 145 into either, operative or inoperative, position.

The operating lever 146 (Fig. 9) is normally urged by one end of a torsion spring 165, for instance, into its operative position in which the idler pinion 150 is in mesh with the pinion 133, so that the disks 27 and 28 are turned in unison on turning the driving disk 28 (Fig. 15). The lever 146 extends through a slot 166 in the casing 20 (see also Fig. 14) in order to be depressible into inoperative position in which the idler pinion 150 is out of mesh with the pinion 133 and the disks 27 and 28 are disconnected. The lever 146 cooperates in either, operative or inoperative, position with a preferably adjustable stop 167 in the casing 20 (Figs. 9 and 13), and carries a brake piece 168 which engages the teeth of the pinion 133 and, hence, arrests the disk 27 against rotation, when the latter is not drivingly connected with the driving disk 28, as will be readily understood.

The next operating lever 147 (Fig. 10) is normally urged by the other end of the torsion spring 165 into its operative position, in which the idler pinion 151 is in mesh with the pinion 134, so that the disks 28 and 29 are turned in unison on turning the driving disk 28 (Fig. 15). The torsion spring 165 is mounted on a post 170 in the casing 20 (see also Fig. 13). The lever 147 extends through a slot 171 in the casing 20 (see also Fig. 14) in order to be depressible into inoperative position in which the idler pinion 151 is out of mesh with the pinion 134 and the disks 28 and 29 are disconnected. The lever 147 cooperates in either, operative or inoperative, position with a preferably adjustable stop 172 in the casing 20 (Figs. 10 and 13), and carries a brake piece 173 which engages the teeth of the pinion 134 and, hence, arrests the disk 29 against rotation, when the latter is not drivingly connected with the driving disk 28. The last operating lever 148 is normally urged by a spring 175, for instance, into the inoperative position shown in Fig. 11 in which the idler pinion 152 is out of mesh with the pinion 135. The spring 175 may be in form of a leaf suitably secured to the lever 148 and engaging a pin 176 in the casing 20 (see also Fig. 13). When the lever 148 is in its inoperative position, a brake piece 177 carried thereby engages the teeth of the pinion 135 and thus arrests the disk 30 against rotation. The lever 148 extends through a slot 178 in the casing 20 (see also Fig. 14) so as to be depressible into operative position in which the idler pinion 152 is in mesh with the pinion 135 and the disk 30 drivingly connected with the driving disk 28. Provided in the casing 20 is a preferably adjustable stop 179 (Figs. 11 and 13) with which the lever 148 cooperates in its inoperative position.

The use of the instrument may be explained in connection with the following illustrative example, reference being had particularly to Figs. 2, 4, and 15. Assume that a flight is to be undertaken to an objective whose true bearing is azimuth 75°, that the compass variation for the locality is 20° east, that the indicated air speed of the plane is 150 miles per hour, that the pilot is flying at an altitude of 5000 ft., that the temperature is +80° F., and that the wind is blowing 40 miles per hour from the northwest. The adjustments of the instrument for the conditions mentioned are shown in Fig. 4, and these adjustments may be undertaken in the following manner.

The lever 148 is depressed in order drivingly to connect the magnetic compass disk 30 and the driving disk 28 (see also Fig. 15), and said driving disk 28 is thereupon turned by hand on its exposed periphery until the arrow 108 on the magnetic compass disk 30 points to the 20° east variation mark of the scale 112 on the top plate 31 and the zero mark of the azimuth scale 107 on said disk 30 aligns with the 20° mark of the azimuth scale 110 on said top plate 31. It appears best from Fig. 15 that the disks 27 and 29 will also be turned by the driving disk 28 unless the levers 146 and 147 are depressed into inoperative position. It is, of course, preferable not to depress the levers 146 and 147 since the rotation of the disks 27 and 29 together with the disks 28 and 30 does not interfere with the setting of the magnetic compass disk 30. Having set the magnetic compass disk 30, as explained, the lever 148 is released, thereby interrupting the driving connection between the disks 28, 30 and arresting the magnetic compass disk 30 in its set position (Fig. 11).

Next, the air speed or driving disk 28 may be set relative to the air speed correction disk 29 to undertake the correction in the indicated air speed of the plane in accordance with the flight altitude and air temperature. To this end, the air speed correction disk 29 is disconnected from the driving disk 28 and arrested against rotation, by depressing the lever 147 (Figs. 10 and 15), and the driving disk 28 is then turned until the 5000 ft. mark of the pressure altitude scale 100 thereon aligns with the +80° F. mark of the temperature scale 105 on the disk 29. This time the disk 27 will also be turned, without detriment, by the driving disk 28, unless the lever 146 is depressed into inoperative position (which is preferably not done). The lever 147 (Figs. 10 and 15) is then released so that the disks 28 and 29 become reconnected for combined rotation.

Next, the instrument may be set in accordance with the indicated air speed of the plane (150 miles per hour). To this end, the air speed or driving disk 28 and relatively adjusted air speed correction disk 29 are turned in unison relative to the heading disk 27 until the 150 miles per hour mark of the speed scale 106 on the disk 29 aligns with the index line 90 on the disk 27. This is accomplished by depressing the lever 146 (Figs. 9 and 15) and turning the driving disk 28 until the described adjustment is made, whereupon the lever 146 is released, as will be readily understood.

Next, the instrument may be set in accordance with the direction of the wind (northwest). To this end, the driving disk 22 is turned, without depressing the lever 145 (Figs. 8 and 15), until the index line 82 on the wind direction disk 23 aligns with the NW mark of the scale 111 on the top plate 31 (Fig. 4). By not depressing the lever 145, the disk 23 will turn in unison with the driving disk 22, as will be readily understood.

Next, the instrument may be set in accordance with the velocity of the wind (40 miles per hour). To this end, the lever 145 (Figs. 8 and 15) is depressed, thereby disconnecting the driving disk 22 from the wind direction disk 23 and arresting the latter in its set position. The disk 22 is then turned until the 40 miles per hour mark of the scale 80 thereon aligns with the index line 82 on the wind direction disk 23, whereupon the lever 145 is released to establish the driving connection between the disks 22, 23.

The instrument is then finally set in accordance with the true bearing of the objective (azimuth 75°). To this end, the driving disk 28 is turned, without depressing any of the operating levers, until the track pointer 26 aligns with the 75° mark of the azimuth scale 110 on the top plate 31, whereby said track pointer 26 also indicates on the azimuth scale 107 of the set disk 30 the magnetic bearing of the objective (azimuth 55°). Since none of the operating levers is depressed this time, the disks 27, 28 and 29 in their adjusted relative angular position are turned in unison on turning the driving disk 28, as will be readily understood.

The instrument being now set, the magnetic course or heading is then indicated by the index line 90 of the heading disk 27 on the scale 107 of the disk 30 (and the true heading on the scale 110 of the top plate 31), while the ground speed is indicated on the scale 17 of the track link 24 opposite the pivot 19. The adjustments above described and illustrated in Fig. 4, show that in order to fly a track whose true bearing is azimuth 75° under the conditions above stated, the pilot's magnetic course or heading should be azimuth 44° and that the ground speed of the plane is about 183 miles per hour. The wind drift angle is indicated by the track pointer 26 on the scale 96 of the disk 27, being, in the example given and adjustment shown, about 11° right. Inasmuch, however, as the setting of the instrument for given conditions shows directly the magnetic heading required under such conditions, it is not absolutely necessary to know the drift angle, and the scale 96 may, if desired, be omitted.

While in the present instance the driving connections between the various rotary disks of the instrument are provided in the lower end of the casing 20 (Figs. 2 and 4), it is to be understood that the present invention is not limited to such location of said driving connections since they may be provided with equal advantage in the upper end of the casing without departing from the spirit of the present invention. Thus, the instrument as illustrated is convenient to handle when the same lies on a table or other support, the operating levers 145 to 148 being manipulated with the left thumb and the disks 22 and 28 turned with the right index finger, for instance. For operating the instrument while holding it in one hand, the driving connections between the various rotary disks are preferably provided in the upper end of the casing 20.

It will be observed that the true course or track, the wind velocity and direction, the true and magnetic headings, the air speed and the ground speed, are all independently indicated on separate scales, making it unnecessary to change the adjustment for any of these factors in order to determine another or others, so that indications of all factors are available at all times.

I claim:

1. The combination of a plurality of independently coaxially turnable disk gears of which one is the driver and the others are driven and of the same diameter, separate identical gear trains for drivingly connecting said one disk gear with the driven disk gears, respectively, at a one-to-one speed ratio, said gear trains include a common pinion in permanent mesh with said one disk gear and each gear train further comprises a first gear in permanent mesh with its respective driven disk gear and permanently meshing intermediate gears of which one turns coaxially of, and in unison with, said common pinion, an operating lever pivoted coaxially of said common pinion and rotatably carrying the other intermediate gear for moving the latter to and from meshing engagement with said first gear.

2. The combination set forth in claim 1, further comprising a brake for each driven disk gear rendered operative and inoperative by the operating lever of its connected gear train on rocking the same from, respectively, into, meshing engagement with said first gear of the same train.

3. The combination of a casing, a plurality of independently coaxially turnable disk gears in said casing of which one is a driver of larger diameter and the others are of smaller but identical diameters, separate identical gear trains in said casing for drivingly connecting said driver with the other disk gears, respectively, at a one-to-one speed ratio, an arrester in said casing for each of said other disk gears, and a separate device in said casing for each gear train including a pivoted lever projecting outside said casing for disconnecting its respective gear train and rendering the corresponding arrester operative on rocking said lever in one direction, and for reconnecting the same gear train and rendering the same arrester inoperative on rocking said lever in the opposite direction, said driver extending with its periphery beyond said casing to be accessible for driving purposes.

4. The combination set forth in claim 3, further comprising a spring in said casing for each lever to urge the latter in one of the opposite directions of its rocking motion.

JOHN P. PUTNAM.